E. BENNER.
IRRIGATING VALVE.
APPLICATION FILED SEPT. 30, 1918.
1,301,030.
Patented Apr. 15, 1919.
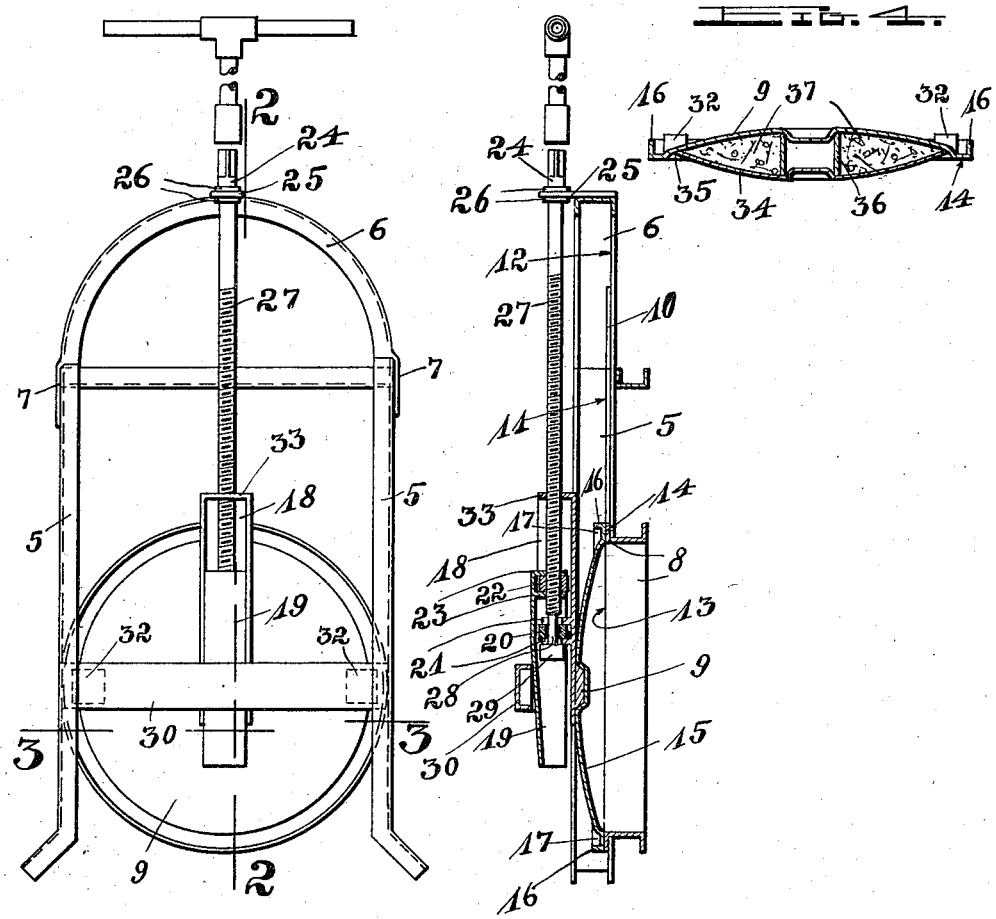

UNITED STATES PATENT OFFICE.

EDWARD BENNER, OF LOS ANGELES, CALIFORNIA.

IRRIGATING-VALVE.

1,301,030.

Specification of Letters Patent.  Patented Apr. 15, 1919.

Application filed September 30, 1918. Serial No. 256,192.

*To all whom it may concern:*

Be it known that I, EDWARD BENNER, a citizen of the United States, residing at Los Angeles, in the county of Los Angeles and State of California, have invented a new and useful Irrigating-Valve, of which the following is a specification.

This invention relates to irrigating valves of the gate-type.

It is an object of the invention to provide a gate-valve which may easily be disposed and secured in irrigation pipe lines and other similar water distributing systems.

Another object is to make the several parts, which can be possibly made so, out of pressed sheet metal.

Another object is to provide a wedge on the spindle, the spindle operating the wedge and the gate separately in relation to the valve seat.

Another object is to provide proper attaching means on the frame for securing the valve or gate in its position, when used in irrigation pipe lines.

Other objects will appear from the following description and appended claims as well as from the accompanying drawing, in which—

Figure 1 is a front elevation of the device.

Fig. 2 is a vertical cross section of the device on line 2—2 of Fig. 1.

Fig. 3 is a horizontal cross section of the device on line 3—3 of Fig. 1.

Fig. 4 is a slightly modified construction of the valve-cover for reinforcing the cover, in front elevation.

Similar numbers refer to similar parts throughout the several views.

In Fig. 1, 5 designates the main frame members, and 6 the arch-shaped top end of the main frame. This main frame, I preferably make of channel iron, the side members 5 secured to the top end 6 at 7 by bolts or any other similar suitable means, to make a strong rigid base for the other parts to be mounted on, and at the same time forming a good guide-way for the gate to be operated in. Another channel iron is shown in ring-form to form the valve seat 8, this, of course, not meaning that the seat has to be round, but may just as well be square, or have any other suitable form in its free area, as will easily be understood.

Being illustrated in ring-form, the one flange of the ring-channel is made to engage over one flange of the side members 5, as can be more clearly seen in Figs. 2 and 3. At the points of engagement, the seat-ring is naturally riveted or otherwise suitably secured to the side members to form one frame with the side members. The outer face of the flange of the seat-ring is naturally not level with the inner face 12 of the side members, which would naturally cause the valve cover 9 to unseat when shifted beyond the flange of the seat-ring. To prevent this, a filler plate or bar 10 is suitably secured to the inner face of the flanges of the side members to bring the working faces 11 of the side members 5 level with the working face of the channel-ring, which is the valve seat, indicated at 13.

The cover plate 9 is pressed out of sheet metal to form the seat part 14, the arch-shaped body 15, and the edge flanges 16. Between the edge flanges and the arched body, the metal is pressed to form a recess all around the edges, as indicated at 17, so as to reinforce the whole edge to such an extent that the seat part 14 will be narrow enough not to give under any pressure under which so constructed valves or gates may have to work. Such recess or impression along the edge makes it also possible to make that seat part especially smooth under the die, as will easily be understood. If, however, it should be desirable to have a finishing done on those working-surfaces, or to have extra layers on all the working surfaces, it will easily be understood that such extra layers can easily be applied to the working surfaces 11 and 13 as well as to the seat part 14. Brass, bronze, babbitt and other similar material can of course be used for such layers, as is common for making such working surfaces in valves and similar articles water- and air-tight.

The operating bar or member 18 is suitably secured to the outside of the cover plate 9, preferably made recessed as illustrated in the drawing to receive and form the guideway for the wedge 19. A nut 20 is loosely disposed between the two shoulders 21 within the guideway in the operating member 18. Another nut 22 is loosely disposed between the shoulders 23 within the wedge 19. Both nuts 20 and 22 are endwise engaged between the shoulders 21 and 23.

The spindle 24 is turnably mounted on the main frame at its top end 6. A suitable support or brace 25 is for that purpose suitably secured to that top end 6, and the spindle is provided with shoulders 26 for providing bearings for holding the spindle within the support 25 against endwise movement. The threaded part 27 of the spindle normally engages with the nuts 20 and 22. The end of the threaded part is turned off forming the disengaging stem 28, of which the free end is provided with an end shoulder ring 29.

A cross bar 30 is bent, engaging with its free ends 31 under the free flanges of the side members of the main frame and engaging with its middle over the cover so as to bring the wedge between the cross bar and the cover. To keep the cross bar in its position, suitable rest members or blocks 32 are provided on the cover, over which the cross bar engages loosely since the cross bar is also preferably made of channel iron, so as to allow a moving of the cross bar and cover toward each other when the wedge is not in closing position between the cross bar and cover, providing for an easy sliding of the cover with the cross bar within the main frame when drawn out or pressed down by the spindle.

Showing the gate valve in Figs. 1 and 2 in closed position, the opening will proceed as follows: Turning the spindle 24 in the direction to cause the nut 22 in the wedge to move in an upwardly direction along the threaded part 27 of the spindle, will naturally bring the upper end of the wedge 19 to engage with the shoulder 33 on the operating member 18 on the cover 9. The wedge, coming to this position, naturally is by such movement withdrawn from between the cross bar and the cover to such an extent as to relieve the cover and also the ends 31 of the cross bar enough to allow a shifting of the cover from that moment on. A further turning of the spindle then naturally draws the cover and cross bar upwardly with the wedge out of engagement from between the cross bar and the cover until the threaded part 27 of the spindle engages also with the second nut, the nut 20 in the guideway of the operating member 18. The cover can then easily be withdrawn from the opening in the frame or the gate valve.

Having the two nuts in their particular position, engaging with the spindle in this particular manner, serves to hold the wedge in such upper position when closing the valve until the cover is in its correct position, before the opening in the valve, when the nut 20 in the operating member on the cover will again disengage from the threaded part 27 on the spindle. From then on the wedge alone will move, shifting back to its position between the cross bar and the cover while the cover is prevented from shifting further downwardly by the shoulder ring 29, as will easily be understood.

This arrangement of the two nuts serves to prevent the wedge from moving between the cross bar and the cover in case that the cover or cross bar should stick within the frame before reaching the proper position before the opening in the valve. Such sticking of the cover before reaching its proper position is easily possible in irrigation where sand or any other dirt or waste is liable to get into the pipe lines, and such sticking of the cover will naturally cause the wedge to advance between the cross bar and the cover by the normal turning of the spindle even before cover and cross bar have reached their proper position before the opening in the valve; if not means are arranged and provided in a similar manner as described above, to practically engage the wedge in inoperative position to insure the operating and closing of the cover to its closing position before the opening in the valve, before the wedge is allowed to advance between cover and cross bar.

In Fig. 4, the cover 9 is slightly modified for further reinforcement. Another arched plate 34 is suitably welded or secured to the underside of the cover at 35, and a tube 36 is disposed inside between the cover plate and the second plate 34. Fillings 37 of any suitable material can easily be placed within the space between the cover plate and the second plate, if desired for further reinforcement, as will easily be understood.

Having thus described my invention, I claim:

1. In a valve of the class described, a frame made of channel bars with the flanges of the two opposite bars toward each other, a valve seat also made of channel bar with one flange engaging over one flange of the frame within the frame and secured at the points of engagement to the frame, and a cover plate slidingly disposed between the flanges of the two opposite bars of the frame so as to normally engage with the valve seat.

2. In a valve of the class described, a frame made of channel bars with the flanges of the two opposite bars toward each other, a valve seat also made of channel bar with one flange engaging over one flange of the frame within the frame and secured at the points of engagement to the frame projecting beyond the frame forming the attaching means for the valve, the two opposite bars extending upwardly and having a connection forming the cross bar in the upper portion of the frame.

3. In a valve of the class described, a frame made of channel bars with the flanges of the two opposite bars toward each other, a valve seat also made of channel bar with one flange engaging over one flange of the frame and secured at the points of engagement to the frame, a closure plate made of pressed sheet metal slidingly disposed between the flanges of the two opposite bars of the frame so as to normally engage with the valve seat, a cross bar made of channel bar slidingly disposed with its free ends in the frame crosswise to the closure plate, and a wedge made of pressed sheet metal slidingly disposed between the cross bar and the closure plate longitudinally to the frame.

4. In a valve, a frame, a valve seat near one end of the frame, a bearing at the other end of the frame, a closure plate slidingly mounted within the frame normally engaging with the valve seat, a cross bar slidingly mounted in the frame crosswise to the frame and to the closure plate, a wedge slidingly disposed between the cross bar and the closure-plate longitudinally to the frame, and a spindle turnably mounted in the bearing having means for engaging with the closure plate and the wedge when closing the closure plate in relation to the valve seat and having other means for disengaging from the closure plate when the closure plate is in closing position in relation to the valve seat while the wedge is pushed between the cross bar and the closure plate by the spindle for tightening the closure-plate against the valve seat.

5. In a valve of the gate type in combination with the closure plate, a nut disposed on the closure plate with the bore in the direction of the shifting of the closure plate, and a spindle having means to engage with the nut for shifting the closure plate and having other means for disengaging from the nut when the closure plate is in closing position while the spindle is operated in the closing direction.

6. In a valve in combination with a frame and operating means, a closure plate made out of pressed sheet metal reinforced by such pressed form and having a die-made impression along its outer edges, forming on the plate a smooth surface for coöperation with the seat.

7. In a valve of the gate type, a frame, a valve seat near one end of the frame longitudinally of the frame, a closure plate made out of sheet metal pressed for reinforcement, and operating means disposed for operating the closure plate in relation to the valve seat on the frame having means for compelling the proper seating of the closure plate.

In testimony that I claim the foregoing as my invention I have signed my name in presence of two subscribing witnesses.

EDWARD BENNER.

Witnesses:
 OTTO H. KRUEGER,
 PHEBE A. PARKER.

Copies of this patent may be obtained for five cents each, by addressing the "Commissioner of Patents, Washington, D. C."